(12) United States Patent
Park

(10) Patent No.: US 10,391,747 B2
(45) Date of Patent: Aug. 27, 2019

(54) SWELLING TAPE COMPRISING POLYURETHANE FILM AND METHOD FOR MANUFACTURING SAME

(71) Applicant: SEIL HITEC CO., LTD., Cheongju-si (KR)

(72) Inventor: Kwang-Min Park, Cheongju-si (KR)

(73) Assignee: SEIL HITEC CO., LTD., Cheongju-Si (KR)

( * ) Notice: Subject to any disclaimer, the term of this patent is extended or adjusted under 35 U.S.C. 154(b) by 740 days.

(21) Appl. No.: 14/926,915

(22) Filed: Oct. 29, 2015

(65) Prior Publication Data
US 2016/0376472 A1  Dec. 29, 2016

(30) Foreign Application Priority Data
Jun. 24, 2015  (KR) .......................... 10-2015-0089560

(51) Int. Cl.
*B32B 27/08*  (2006.01)
*B32B 27/40*  (2006.01)
(Continued)

(52) U.S. Cl.
CPC ................ *B32B 27/08* (2013.01); *B32B 7/12* (2013.01); *B32B 27/00* (2013.01); *B32B 27/06* (2013.01);
(Continued)

(58) Field of Classification Search
CPC ..... C09J 7/0282; C09J 7/25; C09J 4/00; C09J 2475/006; C09J 2201/606; C09J 133/00;
(Continued)

(56) References Cited

U.S. PATENT DOCUMENTS

| 4,425,395 A * | 1/1984 | Negishi ................... D06N 3/14 |
| | | 427/245 |
| 2014/0106207 A1 | 4/2014 | Kim et al. |

(Continued)

FOREIGN PATENT DOCUMENTS

| CN | 103493274 | 1/2014 |
| EP | 2922114 A1 | 9/2015 |

(Continued)

OTHER PUBLICATIONS

"Production of Rigid Urethane Foam Insulation", pp. 1-4, Mar. 26, 2015, http://blog.naver.com/khbkgs1004/220309080438, web.†

*Primary Examiner* — Christopher T Schatz
*Assistant Examiner* — Cynthia L Schaller
(74) *Attorney, Agent, or Firm* — HoustonHogle LLP

(57) ABSTRACT

A swelling tape is disclosed comprising a polyurethane film and a method for manufacturing the same. The swelling tape comprises: a base layer including a polyurethane film that is composed of a chain of monomers joined by urethane links as a result of a reaction between a liquid polyol and a crosslinker; and an adhesive layer formed on a first surface of the base layer in a direction horizontal to a lengthwise direction of the base layer. When made with the liquid polyol and the crosslinker, a resulting polyurethane film exhibits appearance and performance similar to polyurethane film prepared through extrusion. The resulting polyurethane film has a uniform thickness and the advantage of being produced at a low cost.

5 Claims, 2 Drawing Sheets

(51) Int. Cl.

| | |
|---|---|
| *B32B 27/30* | (2006.01) |
| *B32B 27/00* | (2006.01) |
| *B32B 37/02* | (2006.01) |
| *C09J 4/00* | (2006.01) |
| *B32B 7/12* | (2006.01) |
| *B32B 27/06* | (2006.01) |
| *B32B 27/26* | (2006.01) |
| *C09J 7/25* | (2018.01) |
| C09J 133/00 | (2006.01) |
| B32B 37/26 | (2006.01) |
| C08L 75/04 | (2006.01) |
| B29K 75/00 | (2006.01) |
| B29K 105/24 | (2006.01) |

(52) U.S. Cl.
CPC ............ *B32B 27/26* (2013.01); *B32B 27/308* (2013.01); *B32B 27/40* (2013.01); *B32B 37/02* (2013.01); *C09J 4/00* (2013.01); *C09J 7/25* (2018.01); *B29K 2075/00* (2013.01); *B29K 2105/24* (2013.01); *B29K 2995/0068* (2013.01); *B32B 2037/268* (2013.01); *B32B 2255/10* (2013.01); *B32B 2255/26* (2013.01); *B32B 2307/732* (2013.01); *B32B 2307/748* (2013.01); *B32B 2309/105* (2013.01); *B32B 2375/00* (2013.01); *B32B 2405/00* (2013.01); *B32B 2581/00* (2013.01); *C08L 75/04* (2013.01); *C09J 133/00* (2013.01); *C09J 2201/606* (2013.01); *C09J 2433/00* (2013.01); *C09J 2475/006* (2013.01)

(58) Field of Classification Search
CPC ........ C09J 2433/00; B32B 7/12; B32B 27/06; B32B 27/26; B32B 37/02; B32B 27/00; B32B 27/308; B32B 27/08; B32B 27/40; B32B 2307/748; B32B 2255/10; B32B 2307/732; B32B 2255/26; B32B 2581/00; B32B 2375/00; B32B 2037/268; B32B 2309/105; B32B 2405/00; B29K 2075/00; B29K 2105/24; B29K 2995/0068; C08L 75/04

See application file for complete search history.

(56) References Cited

U.S. PATENT DOCUMENTS

| | | | |
|---|---|---|---|
| 2015/0225614 A1* | 8/2015 | Kim | ........................ C09J 7/0289 428/317.3 |
| 2015/0270524 A1* | 9/2015 | Hwang | ................. H01M 2/145 429/94 |
| 2015/0307752 A1 | 10/2015 | Park et al. | |

FOREIGN PATENT DOCUMENTS

| | | |
|---|---|---|
| JP | H11349680 H | 12/1999 |
| KR | 20120113684 A | 10/2012 |
| KR | 20140009089 A | 1/2014 |
| KR | 2014-0063478 A † | 5/2014 |
| KR | 20140063478 A | 5/2014 |
| KR | 20140063479 A | 5/2014 |
| KR | 20140065592 A | 5/2014 |
| KR | 1020140063479 A | 5/2014 |
| KR | 101530591 B1 | 6/2015 |
| WO | WO 2012102586 | 8/2012 |

\* cited by examiner
† cited by third party

SWELLING TAPE COMPRISING POLYURETHANE FILM AND METHOD FOR MANUFACTURING SAME

RELATED APPLICATIONS

This application claims priority under 35 U.S.C. § 119 to Korean Patent Application No. 10-2015-0089560, filed Jun. 24, 2015. The entire teachings of the above application are incorporated herein by reference.

BACKGROUND OF THE INVENTION

1. Field of the Invention

The present invention relates to a swelling tape including a polyurethane film, and a method for manufacturing the same. More particularly, the present invention relates to a swelling tape comprising a polyurethane film prepared by coating a polyol and a crosslinker, and a method for manufacturing the same.

2. Description of the Related Art

A swelling tape is used to fill a gap between two subjects and, if necessary, to fix them to each other.

With an increase in demand on mobile phones and mobile equipment, active research and development has been directed toward rechargeable second batteries, but not disposable batteries. For use in mobile equipment, rechargeable batteries need impact resistance. In this regard, a special tape that swells in an electrolyte is recruited so as to protect internal substances from external impacts by making their positions fixed.

Urethane films used in conventional swelling tapes are a T-die extrusion-type that is prepared by T-die extrusion. As of now, T-die extrusion finds a wide range of applications in preparing plastic films.

For T-die extrusion, resin pellets are fed as a film material into a hopper, melted at a high temperature in an extruder, discharged at a predetermined thickness through a T-die, and extruded into a film while passing through holes.

Generally, because the plastic resins are thermoplastic, molten materials are recovered to the original state thereof immediately after T-die extrusion. Thus, the films prepared by T-die extrusion can be readily used immediately after the process. In addition, T-die extrusion is a relatively simple process so that it can be advantageously applied to mass production. However, when characteristic articles, such as colored articles, are produced in a small amount by T-die extrusion, the apparatus should be washed, causing a significant loss of time and raw materials. In addition, when films are prepared by T-die extrusion, their properties are dependent on the materials fed, and thus adjusting and changing these properties are difficult. Further, a material with a high melting point is prone to having a poor appearance, such as gel, fisheyes, etc., when it is not completely melted.

Conventional research into swelling tapes has been directed mainly toward the arrangement of an adhesive layer to achieve a three-dimensional shape through the inflation of a base layer.

Reference may be made to, for example, Korean Patent Unexamined Application Publication Nos. 10-2014-0009089, 10-2014-0063478, 10-2014-0063479, 10-2014-0065592, and 10-2012-0113684. These related arts disclose the formation of a base layer by extrusion and curing or by forming a coated cast layer and curing under light or heat.

SUMMARY OF THE INVENTION

It is an objective of the present invention to provide a swelling tape, including a polyurethane film prepared by coating a mixture of a liquid polyol and a crosslinker, which exhibits the same levels of appearance and performance as an extruded polyurethane film, has a uniform thickness, and can be produced at a low cost. Also, it is an object of the present invention to provide a method for manufacturing the same.

It is another object of the present invention to provide a method for manufacturing a swelling tape including a polyurethane film, which overcomes problems with conventional T-die methods, and by which not only can the polyurethane film be guaranteed high strength, but also the product can be provided with appearance reliability and desired color.

In accordance with an aspect, the present invention provides a swelling tape, comprising:

a base layer including a polyurethane film that is composed of a chain of monomers of the following Chemical Formula 1 joined by urethane links as a result of reaction between a liquid polyol and a crosslinker; and an adhesive layer formed on a first surface of the base layer in a direction horizontal to a lengthwise direction of the base layer.

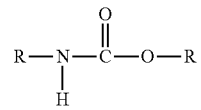

<Chemical Formula 1>

In one exemplary embodiment of the present invention, the polyurethane film has a glass transition temperature (Tg) of 140° C. to 220° C.

In another exemplary embodiment of the present invention, the polyurethane film includes a monomer represented by the following Chemical Formula 2:

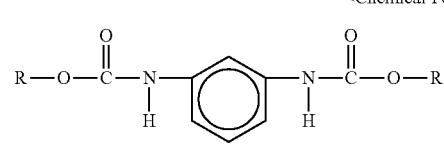

<Chemical Formula 2>

In another exemplary embodiment of the present invention, the crosslinker is an isocyanate.

In another exemplary embodiment of the present invention, the crosslinker is used in an amount of 4% to 8% by weight, based on a weight of the polyurethane.

In another exemplary embodiment of the present invention, the base layer further comprises a monomer represented by the following Chemical Formula 3.

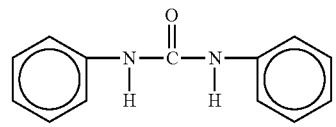

<Chemical Formula 3>

In another exemplary embodiment of the present invention, the base layer is incubated at 40° C. to 65° C. for 24 to 96 hours.

In another exemplary embodiment of the present invention, the adhesive layer is made of acrylic pressure sensitive adhesive (PSA).

In another exemplary embodiment of the present invention, the base layer and the adhesive layer range in thickness from 30 μm to 45 μm and from 5 μm to 20 μm, respectively.

In accordance with another aspect, the present invention provides a method for manufacturing a swelling tape, comprising: (1) coating a first carrier film with a liquid urethane resin, followed by thermally drying to form a base layer on the first carrier film; (2) applying an adhesive to a second carrier film to form an adhesive layer on the second carrier film; (3) laminating the base layer of step (1) with the adhesive layer of step (2); (4) removing the first carrier film; (5) forming a release layer on a second surface of the urethane base layer; and (6) removing the second carrier film.

In another exemplary embodiment of the present invention, step (1) further comprises incubating the base layer at 40° C. to 65° C. for 24 hours to 96 hours.

In another exemplary embodiment of the present invention, the adhesive layer of step (2) is made of acrylic PSA.

In another exemplary embodiment of the present invention, the base layer of step (1) and the adhesive layer of step (2) range in thickness from 30 μm to 45 μm and from 5 μm to 20 μm, respectively.

In other examples, the ranges of values set out above may be adjusted slightly. In one example, the polyurethane film can have a glass transition temperature (Tg) of about 140° C. to about 220° C. In another example, the crosslinker can be used in an amount of about 4% to about 8% by weight, based on a weight of the polyurethane. In another example, the base layer can be incubated at about 40° C. to about 65° C. for about 24 hours to about 96 hours. In another example, the base layer and the adhesive layer range in thickness from about 30 μm to about 45 μm and from about 5 μm to about 20 μm, respectively.

The above and other features of the invention including various novel details of construction and combinations of parts, and other advantages, will now be more particularly described with reference to the accompanying drawings and pointed out in the claims. It will be understood that the particular product and process embodying the invention are shown by way of illustration and not as a limitation of the invention. The principles and features of this invention may be employed in various and numerous embodiments without departing from the scope of the invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
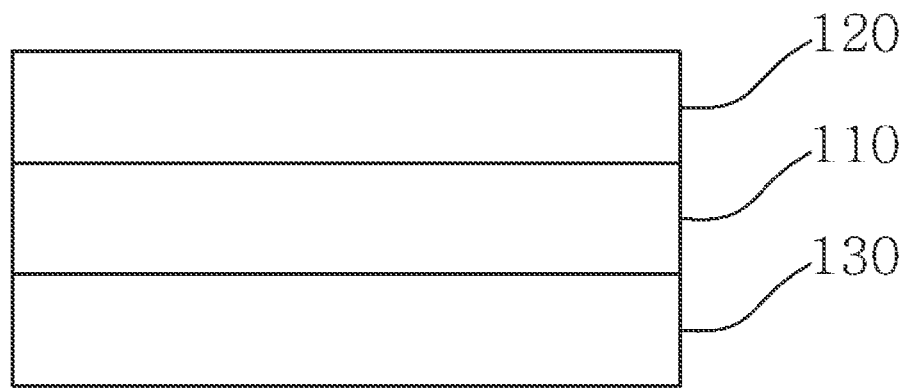
FIG. 1 is a schematic structural view of a swelling tape according to an embodiment of the present invention.

Reference now should be made to the drawings, in which the same reference numerals are used throughout the different drawings to designate the same or similar components. The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

FIG. 1 is a structural view of a swelling tape 100 according to an embodiment of the present invention. With reference to FIG. 1, the swelling tape 100 comprises a base layer 110 and an adhesive layer 120 in accordance with an embodiment of the present invention. Preferably, the swelling tape 100 further comprises a release layer 130.

The base layer 110 may include a polyurethane film. The base layer 110 may have a film or sheet shape designed to swell in contact with a fluid.

In addition, the base layer 110 may have a rectangular, circular, triangular, or amorphous shape.

The polyurethane film is made of a polymer composed of a chain of monomers of the following Chemical Formula 1 joined by urethane links as a result of a reaction between a liquid polyol and a crosslinker.

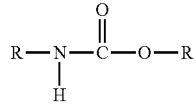

<Chemical Formula 1>

The crosslinker may be an isocyanate.

Formation of the urethane links, having the monomer of Chemical Formula 1, between liquid polyol and a crosslinker may be achieved using a catalyst. This catalyst may be a tin-type catalyst, an aprotic salt, an amine-type catalyst, a peroxo complex, or a metal catalyst.

The polyurethane film may range in glass transition temperature (Tg) from 140° C. to 220° C., and preferably from 170° C. to 190° C. In the glass transition temperature (Tg) range, the polyurethane film exhibits minimal appearance defects and the base layer 110 can be made to have the same levels of tensile strength and elongation as those obtained by extrusion.

The crosslinker may be used in an amount of 4% to 8% by weight, based on the weight of the polyurethane, and preferably in an amount of 6% by weight. A higher content of the crosslinker leads to a larger tensile strength. Less than 4% by weight of the crosslinker cannot attain a tensile strength necessary for the present invention. On the other hand, when the crosslinker is used in an amount greater than 8% by weight, the polyurethane film increases in tensile strength, but decreases in elongation so that the polyurethane film shows poor flexibility, becomes brittle enough to crumple and is likely to snap. In Table 1, tensile strengths and elongations according to contents of the crosslinker are compared.

TABLE 1

Tensile Strength and Elongation according to content of Crosslinker based on weight of Polyurethane

| Crosslinker Content to PU Weight | | SPEC | 1% | 3% | 6% | 9% | 12% |
|---|---|---|---|---|---|---|---|
| Tensile Strength (kg/cm²) | MD | Over 280 | 532 | 612 | 665 | 730 | 850 |
| Elongation (%) | MD | Over 100 | 395 | 385 | 378 | 302 | 280 |

On a first surface of the base layer 110, the adhesive layer 120 may be formed in a direction horizontal to the lengthwise direction of the base layer 110.

The adhesive layer 120 may be made of acrylic pressure sensitive adhesive (PSA). Acrylic PSA shows excellent adhesiveness, stability to temporal variations, and minimum foreign matter.

The arrangement of the adhesive layer 120 may vary depending on the usage condition of the swelling tape. When made with a liquid polyol and the crosslinker in accordance with the present invention, a polyurethane film exhibits appearance and performance similar to those of the polyurethane film prepared through extrusion and has a uniform thickness and the advantage of being produced at a low cost.

The base layer 110 of the swelling tape 10 according to another embodiment of the present invention may include a polyurethane film having a monomer represented by the following Chemical Formula 2.

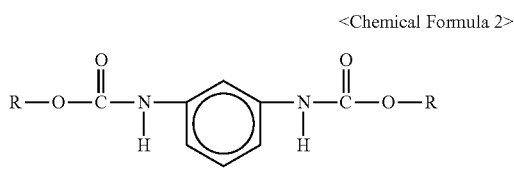

<Chemical Formula 2>

In addition, the base layer 110 may further comprise a monomer represented by the following Chemical Formula 3.

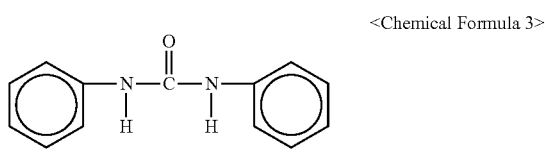

<Chemical Formula 3>

The monomer of Chemical Formula 3 is a post-reaction product generated through the reaction of the crosslinker with water while the liquid polyol reacts with the crosslinker.

The base layer 110 is completed by incubation at 40° C. to 65° C. for 24 hrs to 96 hrs. This incubation allows for minimizing the generation of carbon dioxide through the reaction of the crosslinker with water, and providing the base layer with the same levels of tensile strength and elongation as those produced by extrusion.

Preferably, the base layer 110 has a thickness of 30 μm to 45 μm while the adhesive layer 120 has a thickness of 5 μm to 20 μm.

Adapted to smoothly release the film, the release layer 130 is formed by applying a releasing agent to a second surface of the base layer in a direction horizontal to a lengthwise direction of the base layer 110 opposite to the adhesive layer 120. The releasing agent may be a wax-type agent.

On the second surface of the base layer 110, the release layer 130 may be formed in a direction horizontal to the lengthwise direction of the base layer 110.

In accordance with another aspect thereof, the present invention addresses a method for manufacturing a swelling tape, comprising: (1) coating a first carrier film with a liquid urethane resin, followed by thermally drying to form a base layer on the first carrier film; (2) applying an adhesive to a second carrier film to form an adhesive layer on the second carrier film; (3) laminating the base layer of step (1) with the adhesive layer of step (2); (4) removing the first carrier film; (5) forming a release layer to the second surface of the base layer in a direction horizontal to a lengthwise direction of the urethane base layer; and (6) removing the second carrier film.

In step (1), the coating may be carried out using a method selected from among micro gravure coating, gravure coating, lip coater coating, bar coater coating, slit die coating, slot die coating, and comma coating, the slot die coating method being preferred.

The base layer of step (1) may include a polyurethane film. The polyurethane film is composed of a chain of monomers of the following Chemical Formula 1 joined by urethane links as a result of a reaction between a liquid polyol and a crosslinker.

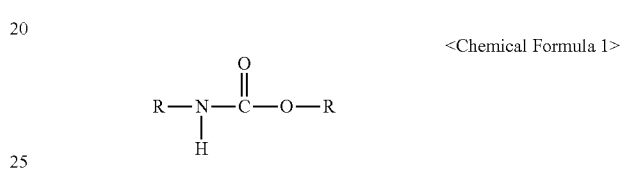

<Chemical Formula 1>

The crosslinker may be an isocyanate.

Formation of the urethane links, having the monomer of Chemical Formula 1, between liquid polyol and a crosslinker may be achieved using a catalyst. This catalyst may be a tin-type catalyst, an aprotic salt, an amine-type catalyst, a peroxo complex, or a metal catalyst.

The polyurethane film may range in glass transition temperature (Tg) from 140° C. to 220° C., and preferably from 170° C. to 190° C. In the glass transition temperature (Tg) range, the polyurethane film exhibits minimal appearance defects and the base layer can be made to have the same levels of tensile strength and elongation as those obtained by extrusion.

The crosslinker may be used in an amount of 4% to 8% by weight, based on the weight of the polyurethane, and preferably in an amount of 6% by weight. A higher content of the crosslinker leads to a larger tensile strength. Less than 4% by weight of the crosslinker cannot attain a tensile strength necessary for the present invention. On the other hand, when the crosslinker is used in an amount greater than 8% by weight, the polyurethane film increases in tensile strength, but decreases in elongation so that the polyurethane film shows poor flexibility, becomes brittle enough to crumple and is likely to snap.

The base layer may include a polyurethane film having a monomer represented by the following Chemical Formula 2.

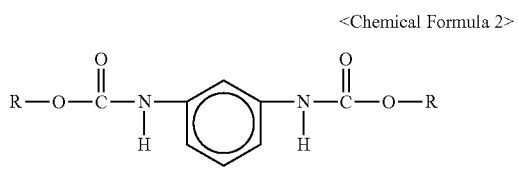

<Chemical Formula 2>

In addition, the base layer may further comprise a monomer represented by the following Chemical Formula 3.

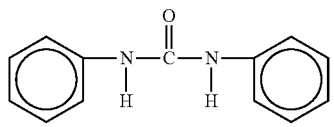

<Chemical Formula 3>

The monomer of Chemical Formula 3 is a post-reaction product generated through the reaction of the crosslinker with water while the liquid polyol reacts with the crosslinker.

In step (1), the thermal drying may be conducted at 40° C. to 150° C. for 1 min. to 4 min.

Step (1) may further comprise incubating the base layer at 40° C. to 65° C. for 24 hrs to 96 hrs. This incubation allows for minimizing the generation of carbon dioxide through the reaction of the crosslinker with water, and providing the base layer with the same levels of tensile strength and elongation as those produced by extrusion.

Step (2) may be carried out using a method selected from among micro gravure coating, gravure coating, lip coater coating, bar coater coating, slit die coating, slot die coating, and comma coating, the slot die coating method being preferred.

Step (2) may further comprise, after laminating, winding the laminated structure and then incubating the structure at 40° C. to 65° C. for 24 hrs to 96 hrs.

In step (2), the adhesive layer may be made of acrylic PSA.

The base layer of step (1) may range in thickness from 30 μm to 45 μm and the adhesive layer of step (2) may be 5 μm to 20 μm thick.

Step (4) may be preferably carried out using a gravure coating technique.

Step (5) may further comprise winding the laminated structure and then incubating the structure at room temperature for 24 hrs, after the formation of the release layer.

Figure 2:
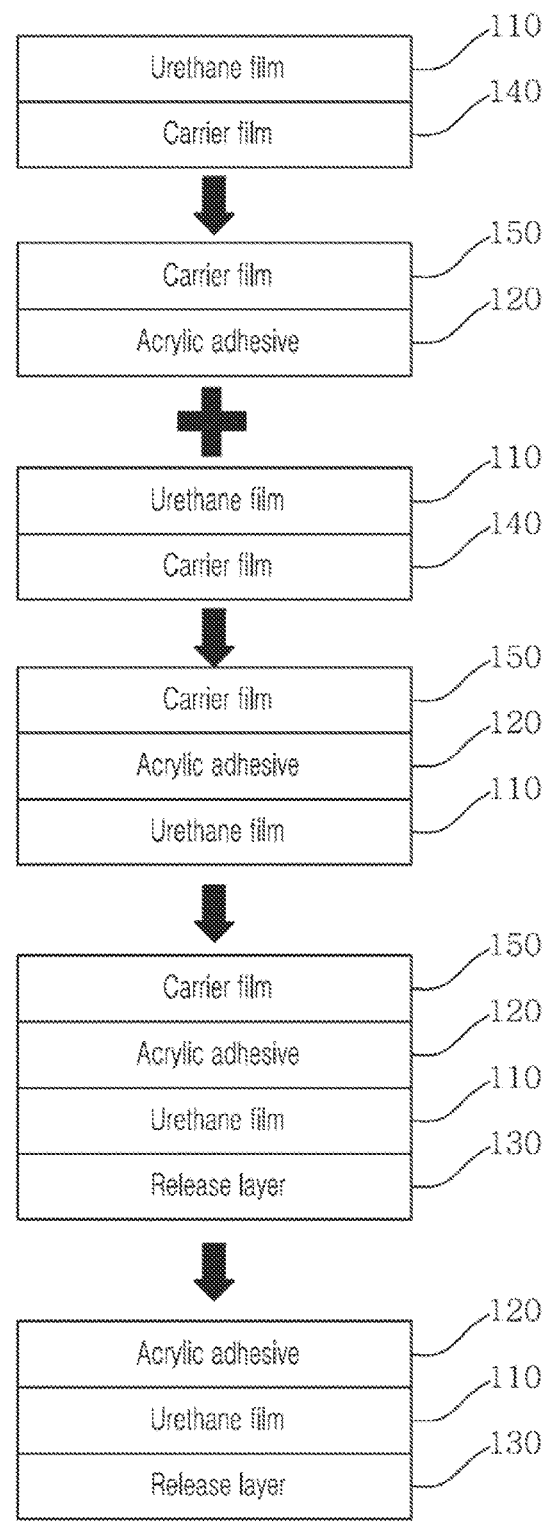
FIG. 2 illustrates a manufacturing process of a swelling tape in a stepwise manner in accordance with another embodiment of the present invention.

FIG. 2 illustrates the manufacture of a swelling tape in a stepwise manner in accordance with another embodiment of the present invention. With reference to FIG. 2, a description will be given of the manufacture of the swelling tape, as follows.

(1) Preparation of Urethane Film

On a first carrier film 140 made of silicone-treated polyethylene terephthalate (PET), a liquid urethane resin containing a liquid polyol and a crosslinker is applied, and then thermally dried to form a urethane film as a base layer 110. Incubation may be conducted at 60° C. for 48 hrs to stabilize the urethane film base layer 110.

(2) Lamination of Acrylic Adhesive Layer with Urethane Film

An adhesive layer 120 is formed by applying an acrylic adhesive to a second carrier film 150, and laminated on the incubated base layer 110. This laminated structure is wound and then incubated at 60° C. for 24 hrs.

(3) Removal of Carrier Film from Urethane Film

For use in coating, the second surface of the urethane film 110 is exposed by removing the first carrier film 140. For this, a slitter process is used. The removal should be carefully conducted so as to prevent scratches from appearing.

(4) Formation of Release Layer

After removal of the first carrier film 140, the exposed second surface of the urethane film 110 is coated with a release layer 130. After this coating, the resulting structure is wound and incubated for 24 hrs.

(5) Processing

The second carrier film 150, used as a support for forming the adhesive layer 120, is delaminated to afford a swelling tape 100. In this regard, the delamination should be conducted under such a minimum tension as to prevent the formation of wrinkles. In addition, the incorporation of air bubbles should be minimized upon winding.

A better understanding of the present invention may be obtained through the following examples which are set forth to illustrate, but are not to be construed as limiting the present invention.

EXAMPLE 1

Preparation of Urethane Film

Using a liquid polyurethane resin obtained by reacting polyol and a crosslinker, a urethane film with a thickness of 40 μm was formed in a slot die coating manner. A silicone-treated releasable polyethylene terephthalate (PET) film was subjected to roll-to-roll processing. A liquid polyurethane resin containing a mixture of the crosslinker and polyol was applied to the release film and thermally dried to give a roll-type film. A total of 5 samples were prepared. The results are listed in Table 2, below.

TABLE 2

Results of Polyurethane Film Coating

| | | SPEC | 1 | 2 | 3 | 4 | 5 | AVG |
|---|---|---|---|---|---|---|---|---|
| Thickness (μm) | | 40 ± 4 | 39 | 41 | 41 | 41 | 42 | 41 |
| Tensile strength (kg/cm2) | MD | over 280 | 511 | 583 | 572 | 613 | 620 | 580 |
| Elongation (%) | MD | over 100 | 290 | 322 | 345 | 296 | 354 | 321 |

Thickness deviation of film: ±2 μm.

EXAMPLE 2

Adhesive Coating and Lamination with Urethane Film

Adhesive coating was also carried out in a slot die coating manner. When directly coated with the adhesive, the urethane film may be apt to undergo thermal deformation during a thermal dry process. Hence, a transmission coating method was employed in which the adhesive was applied to a release film, dried, and then laminated with the urethane film. The results are summarized in Table 3, below.

TABLE 3

Adhesive Coating Result

| | | SPEC | 1 | 2 | 3 | 4 | 5 | AVG |
|---|---|---|---|---|---|---|---|---|
| Thickness | | 12 ± 3 | 12 | 11 | 12 | 12 | 12 | 12 |
| Adhesiveness (gf/25 mm) | SUS | Over 250 | 480 | 490 | 430 | 458 | 427 | 457 |

As listed in tables 1-3, "required Spec" (SPEC) means a standard feature or an appropriate standard for expected conditions when the product is used. The "required Spec" (SPEC) is defined specifically by the values listed in Tables 1-3. The values of the "required Spec" (SPEC) may be compared against the values of Samples 1-5.

For example, Table 3 defines the adhesiveness for the "required Spec" (SPEC) as a value over 250 gf/25 mm. Samples 1-5 have an average adhesiveness value of 457 gf/25 mm, which can be described as greater than the "required Spec" (SPEC) by about 200 gf/25 mm. The adhesive coatings, thus obtained, exhibited good physical properties as they had a thickness deviation of as low as ±1 μm and adhesiveness larger than the "required Spec" (SPEC) by about 200 gf/25 mm.

EXAMPLE 3

Second Surface Coating Process

Adapted to smoothly release the film, a release layer was formed by applying a releasing agent to the second surface of the base layer opposite to the adhesive layer. The releasing agent was a widely used synthetic wax-type agent.

As described hitherto, the swelling tape is based on the formation of a polyurethane film by coating a liquid polyol and a crosslinker and curing and thus enjoys the advantage of reducing the production cost and improving the thickness uniformity.

Further, the manufacturing method of the present invention allows for the elaborate control of the coating thickness, excluding foreign matter, and increasing the strength of the film.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a swelling tape, comprising:
   (1) coating a first carrier film with a liquid urethane resin, that is composed of a chain of organic units of the following Chemical Formula 1 joined by urethane links as a result of reaction between a liquid polyol and an isocyanate, followed by thermally drying to form a base layer on the first carrier film;
   (2) applying an adhesive to a second carrier film to form an adhesive layer on the second carrier film;
   (3) laminating the base layer of step (1) with the adhesive layer of step (2), winding the laminated structure and then incubating the structure at 40° C. to 65° C. for 24 hours to 96 hours;
   (4) removing the first carrier film;
   (5) forming a release layer on a second surface of the urethane base layer; and
   (6) removing the second carrier film,
   wherein the Chemical Formula 1 is:

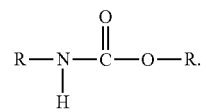

2. The method of claim 1, wherein step (1) further comprises incubating the base layer at 40° C. to 65° C. for 24 hours to 96 hours.

3. The method of claim 1, wherein the adhesive layer of step (2) is made of acrylic PSA.

4. The method of claim 1, wherein the base layer of step (1) and the adhesive layer of step (2) range in thickness from 30 μm to 45 μm and from 5 μm to 20 μm respectively.

5. The method of claim 1, wherein the first carrier film is made of silicon-treated polyethylene terephthalate (PET).

* * * * *